United States Patent [19]

Beach et al.

[11] 4,291,244

[45] Sep. 22, 1981

[54] ELECTRETS

[75] Inventors: William F. Beach, Bridgewater; Dennis M. Mahoney, Long Valley, both of N.J.

[73] Assignee: Union Carbide Corporation, New York, N.Y.

[21] Appl. No.: 72,302

[22] Filed: Sep. 4, 1979

[51] Int. Cl.³ .................. G11C 13/02; H01H 1/02
[52] U.S. Cl. .................................. 307/400; 264/81; 264/104; 427/35; 427/41; 427/58; 427/70; 427/100; 427/248.1; 427/255.6; 427/295; 427/350; 428/411; 428/457; 428/461; 428/500; 428/900; 428/913; 428/929; 428/934; 428/938
[58] Field of Search .................. 29/25, 42; 361/271, 361/275; 307/400; 427/248.1, 255.6, 41, 34, 35, 58, 70, 100, 248 H, 350, 295; 428/411, 500, 457, 461, 900, 913, 929, 934, 938; 264/81, 104; 118/726

[56] References Cited

U.S. PATENT DOCUMENTS

| | | | |
|---|---|---|---|
| 3,246,627 | 4/1966 | Loeb et al. | 118/726 |
| 3,301,707 | 1/1967 | Loeb et al. | 428/457 X |
| 3,421,930 | 1/1969 | Knox et al. | 427/41 |
| 3,600,216 | 8/1971 | Stewart | 428/447 X |
| 3,663,265 | 5/1972 | Lee et al. | 427/41 |
| 3,956,525 | 5/1976 | Yasuba | 427/41 |
| 4,018,945 | 4/1977 | Mehalso | 427/41 |
| 4,047,998 | 9/1977 | Yoshikawa et al. | 307/400 X |
| 4,054,680 | 10/1977 | Sharbaugh | 427/41 X |
| 4,086,499 | 4/1978 | Mishra | 307/400 |
| 4,123,308 | 10/1978 | Nowlin et al. | 427/41 |
| 4,186,164 | 1/1980 | Spivack | 528/396 X |

*Primary Examiner*—Thomas J. Herbert, Jr.
*Attorney, Agent, or Firm*—Frederick J. McCarthy, Jr.

[57] ABSTRACT

A process for preparing polymer electrets comprising the following steps:
(a) providing two electrodes in a deposition zone, said electrodes being in a spaced relationship to one another, having opposing surfaces, and being connected to an external voltage source capable of impressing an intense electric field between the opposing surfaces;
(b) providing a dipolar substituted p-xylylene monomer vapor in sufficient amount to coat the opposing surfaces of the electrodes;
(c) activating the power source; and
(d) introducing the vapor from step (b) into the deposition zone, said zone being under vacuum and at a temperature at which the vapor will condense,
whereby the vapor condenses on the opposing surfaces of the electrodes, the monomer polymerizing to parylene, coating said surfaces, and forming electrets.

8 Claims, No Drawings

ELECTRETS

FIELD OF THE INVENTION

This invention relates to parylene electrets and a process for making same.

DESCRIPTION OF THE PRIOR ART

Electrets may be considered the electrical analog of permanent magnets. While magnets are a collection of aligned magnetic dipoles, electrets are materials containing aligned electric dipoles. Both produce permanent external fields, magnetic in one case and electric in the other. As might be expected, electrets have found commercial application in numerous devices such as microphones, speakers, radiation detectors, and dosimeters, and in electrophotography.

Commercial electrets are divided into two broad types, those made from inorganic materials having relatively high sensitivities and use temperatures, but having relatively small surface areas and being expensive to manufacture, and those made from organic materials having relatively medium sensitivities and large surface areas, and capable of being produced as thin films inexpensively. It is understandable, then, that where the commercial application lends itself to the use of organic materials, for example, when high sensitivity can be sacrificed or thin films are a prerequisite, the organic materials will be selected, particularly because of their much lower cost.

While, theoretically, any polymer which can be used as a dielectric can be made into an electret, there are few which have sufficiently stable polarization to be converted into an electret having an acceptable longevity. Commercial applications have therefore been limited to two particular polymers: polyvinylidene fluoride, which is preferably made into an electret by a technique known as dipole orientation, and polytetrafluorothylene, which is preferably made into an electret by charge injection. Of the two, the former, i.e., the polyvinylidene fluoride, in view of certain inherent qualities and mode of conversion, is presently the commercial choice as an electret because electrets prepared by charge injection have a vulnerable surface charge, which is subject to degradation by environmental conditions such as dust and humidity.

The polyvinylidene fluoride has deficiencies, however, one being a low crystalline melting point of 171° C., approaching which an electret made from the polymer will depole. Another shortcoming lies in the method for making polyvinylidene fluoride electrets which is a multi-step process, the number of steps increasing the cost of its manufacture. The method known as "poling" is accomplished by metallizing both surfaces of the polyvinylidene fluoride film, applying a large electrostatic field to the polymer film heating the polymer, cooling the polymer to room temperature, and then removing the electric field after the polymer has cooled. Dipoles, which at high temperatures are oriented by the field, are "frozen in" when the polymer has cooled. The frozen-in dipole alignment results in a coupling between dimensional and electrical stresses and responses thus providing piezoelectric characteristics, and pyroelectric characteristics as well.

In addition to attempting to cure these deficiencies, those skilled in the art are constantly striving for higher sensitivities and higher frequency responses (via thinner films).

SUMMARY OF THE INVENTION

An object of this invention, therefore, is to provide a method for making polymer electrets by dipole orientation having fewer steps than the prior art technique and through such method to provide a polymer electret, which has a high crystalline melting point, sensitivity, and frequency response.

Other objects and advantages will become apparent hereinafter.

According to the present invention such a method for the preparation of polymer electrets has been discovered comprising the following steps:

(a) providing two electrodes in a deposition zone, said electrodes being in a spaced relationship to one another, having opposing surfaces, and being connected to an external voltage source capable of impressing an intense electric field between the opposing surfaces;

(b) providing a dipolar substituted p-xylylene monomer vapor in sufficient amount to coat the opposing surfaces of the electrodes;

(c) activating the power source; and (d) introducing the vapor from step (b) into the deposition zone, said zone being under vacuum and at a temperature at which the vapor will condense, whereby the vapor condenses on the opposing surfaces of the electrodes, the monomer polymerizing to parylene, coating said surfaces, and forming electrets.

The electret produced by this process comprises, in combination, a conductive metal layer coated with a film of parylene, said parylene film having aligned electric dipoles and an external electric field.

DESCRIPTION OF THE PREFERRED EMBODIMENT

Parylene is well known as a conformal coating used primarily in the electronics industry. It is unique as a coating because of its ability to provide ultra-thin films and conform to substrates of varied geometrical shapes and irregularities. Parylene also has excellent chemical resistance and can be used at relatively high temperatures. Another unusual characteristic of parylene is the method by which the coating is formed.

Parylene is a generic term applied to the family of unsubstituted and substituted poly-p-xylylenes. The polymers can be homopolymers or co-polymers depending on whether they are derived from one particular dimer or a mixture of different dimers. The unsubstituted homopolymer poly-p-xylylene has the structure

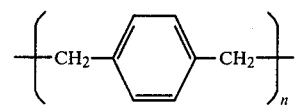

and substituted homopolymers may be illustrated by the following structures:

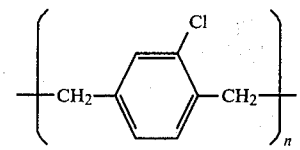

-continued

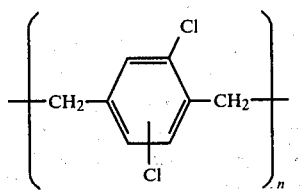

In subject process, however, the monomer must be dipolar. In fact, the greater the dipole moment the better. Thus, the monomer will be substituted in its aromatic aromatic nucleus, examples of these substituents being single chlorine or bromine atoms or cyano groups at any of the four available positions of the aromatic nucleus or ortho-dichloro, ortho-dibromo, or ortho-dicyano radicals at two of the four positions on the nucleus. Fluorine atoms or other substitutents can be substituted for the hydrogen atoms in the methylene groups if desired. Those skilled in the art will understand that the dimer and monomer utilized in the process must be vaporizable under process conditions.

A description of parylene, processes for making it, and the apparatus in which parylene deposition can be effected may be found in U.S. Pat. Nos. 3,246,627; 3,301,707; and 3,600,216, all of which patents are incorporated by reference herein. It will be observed, however, that the term "parylene" is not used in these patents. Instead, the term poly-p-xylylene is used generically and this term is considered to include both the unsubstituted and substituted varieties in the form of homopolymers or copolymers just as the term parylene in this specification.

The process for coating a substrate with parylene is conventional. Typical steps and conditions of such a process involve first vaporizing a cyclic dimer which contains the desired repeating unit, e.g., cyclic di-p-xylylene, at a pressure of about 10 to about 100 microns and at a temperature of about 150° C. to about 200° C.; then, pyrolyzing the vaporized cyclic dimer at a slightly lower pressure at about 670° C. to about 690° C., the pyrolysis step breaking the benzylic carbon to carbon bonds to provide the p-xylylene monomer in the vapor state; and, finally, introducing the vaporous monomer into a deposition chamber containing the substrate at still slightly lower pressure, but at ambient temperatures in the range of about 20° C. to about 30° C., where the diradical condenses and polymerizes on all of the exposed surface of the substrate to provide a thin parylene film. There is a slight pressure gradient established throughout the process, the pressure progressively getting lower in each stage. This pressure differential drives the vapor from one stage of the process to the next.

The apparatus used typically comprises a vaporizer or sublimator section, a pyrolysis zone, and a deposition chamber, all connected by tubing, with the deposition chamber having a valved outlet connected to a pump for providing the required vacuum. Heating means for vaporization and pyrolysis are provided while condensation is effected by ambient temperature.

The same process, apparatus, and dimer (with the proviso that it is dipolar) are used here to prepare electrets with one modification. The substrates used are electrode materials, generally metallic, and are connected to an external voltage source of sufficient potential to align the electric dipoles. It is preferred that the electrodes are parallel to each other, i.e., all surface normals are of equal length. This can be accomplished with parallel plates, coaxial cylinders, or concentric spheres.

It will be understood by those skilled in the art that the parylene film, which has been converted to an electret by subject process, can be stripped from the metal electrode and will be self-supporting.

The invention is illustrated by the following examples:

EXAMPLE 1

A five hundred Angstrom layer of aluminum is deposited on one side of each of two one inch by five inch glass slides to provide adhesion for the subsequent layer and facilitate removal of the electret. Then, a 1000 Angstrom layer of gold is deposited on top of the aluminum on each slide. Electropolishing of all metal surfaces and deposition of metal through a shadow mask to remove sharp edges is recommended to reduce field emission breakdown. These slides are placed parallel to each other in a parylene deposition chamber, referred to above, so that the gold layers face each other and are spaced one millimeter apart. The holder is electrically conductive and is connected to an external power source in such a manner that it has a positive side and a negative side. One of the gold layers is connected to the positive side of the holder and the other gold layer to the negative side of the holder. A 15 kilovolt external source incorporating a $3 \times 10^8$ ohm resistor placed in series with the source is used to generate an electric field. The voltage across the electrodes is measured with an electrometer equipped with a 10 kilovolt probe.

25 grams of cyclic di-chloro-di-p-xylylene are loaded into a sublimator, which is heated to a temperature of 175° C. to provide a pressure of about 10 microns; the vaporized dimer is then pyrolyzed at slightly lower pressure and a temperature of 670° C. to form the monomer, which is introduced into the deposition chamber in the vapor state at a still slightly lower pressure and under the described electric field at ambient temperature where a film having a thickness of about 8 microns is grown on each gold electrode. Process time is about 65 minutes. The slides are removed and one centimeter diameter gold and black gold dots are vaporized on to the film surface, the gold layer being about 1000 Angstroms in thickness and the black gold slightly thicker.

The gold coated parylene film is shown to exhibit a pyroelectric response by directing chopped radiation from a tungsten iodide lamp in a quartz jacket incident to the gold-black gold absorbing surface. The signal emitted by this radiation is converted to a heat signal by the gold-black gold causing a dimensional change in the film, which generates an AC current in an external circuit. The generated output is measured with a lock-in amplifier. The measurements indicate a pyroelectric response of 1.5 nanoamperes per watt per square centimeter of incident radiation.

EXAMPLE 2

Example 1 is repeated except that 10 grams of dimer are used and the electrodes are aluminum layers having a thickness of 1000 Angstroms. No gold is present in the deposition chamber. A 6.75 kilovolt per centimeter field is used and a 5 micron parylene film is grown on the aluminum. Process time is about 40 minutes. The gold dots are about 500 Angstroms in thickness and the black gold slightly thicker. The measurements indicate a pyroelectric response of approximately 2 nanoamperes per watt per square centimeter of incident radiation.

EXAMPLE 3

Example 1 is repeated except that 65 grams of dimer are used; the initial operating pressure of the system is 7.7 microns; the power source is 7.0 kilovolts; the run is completed in 80 minutes; and the film thickness is about 12 microns.

It is found from the examples that process time is short with few steps and high crystalline melting points, sensitivities, and frequency response are achieved.

I claim:

1. A process for preparing polymer electrets comprising the following steps:
   (a) providing two electrodes in a deposition zone, said electrodes being in a spaced relationship to one another, having opposing surfaces, and being connected to an external voltage source capable of impressing an intense electric field between the opposing surfaces;
   (b) providing a dipolar p-xylylene monomer vapor in sufficient amount to coat the opposing surfaces of the electrodes;
   (c) activating the power source to provide sufficient potential to align the dipoles of the p-xylene monomer coat; and
   (d) introducing the vapor from step (b) into the deposition zone, said zone being under vacuum and at a temperature at which the vapor will condense, whereby the vapor condenses on the opposing surfaces of the electrodes, the monomer polymerizing to parylene, coating said surfaces, and forming electrets.

2. The process defined in claim 1 wherein the aromatic nucleus of the monomer contains chloro, ortho-dichloro, cyano, or ortho-dicyano radicals.

3. The process defined in claim 1 wherein fluorine atoms are substituted for the hydrogen atoms of the methylene groups in the monomer.

4. An electret comprising, in combination, a conductive metal layer coated with a film of a dipolar parylene, said parylene film having aligned electric dipoles and an external electric field.

5. The electret defined in claim 4 wherein the parylene has chloro, ortho-dichloro, cyano, or ortho-dicyano substituents in its aromatic nucleus.

6. The electret defined in claim 4 wherein fluorine atoms are substituted for the hydrogen atoms of the methylene groups in the parylene.

7. An electret consisting essentially of a film of a dipolar parylene.

8. The electret defined in claim 7 wherein fluorine atoms are substituted for the hydrogen atoms of the methylene groups in the parylene.

* * * * *